C. W. PARKER.
CONTROLLING MEANS FOR TRANSMISSION GEARING.
APPLICATION FILED JUNE 11, 1910.
983,249.
Patented Jan. 31, 1911.
3 SHEETS—SHEET 1.
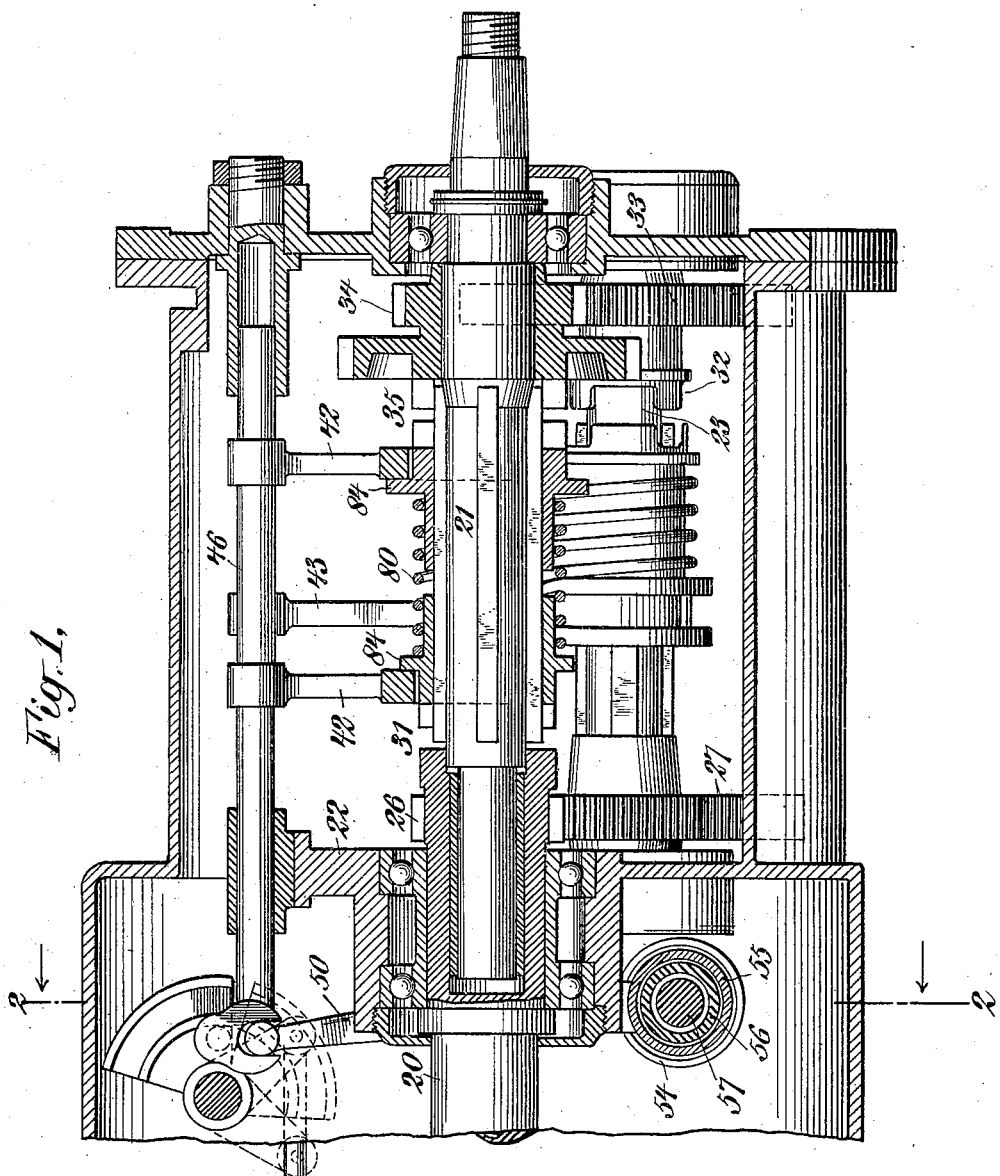

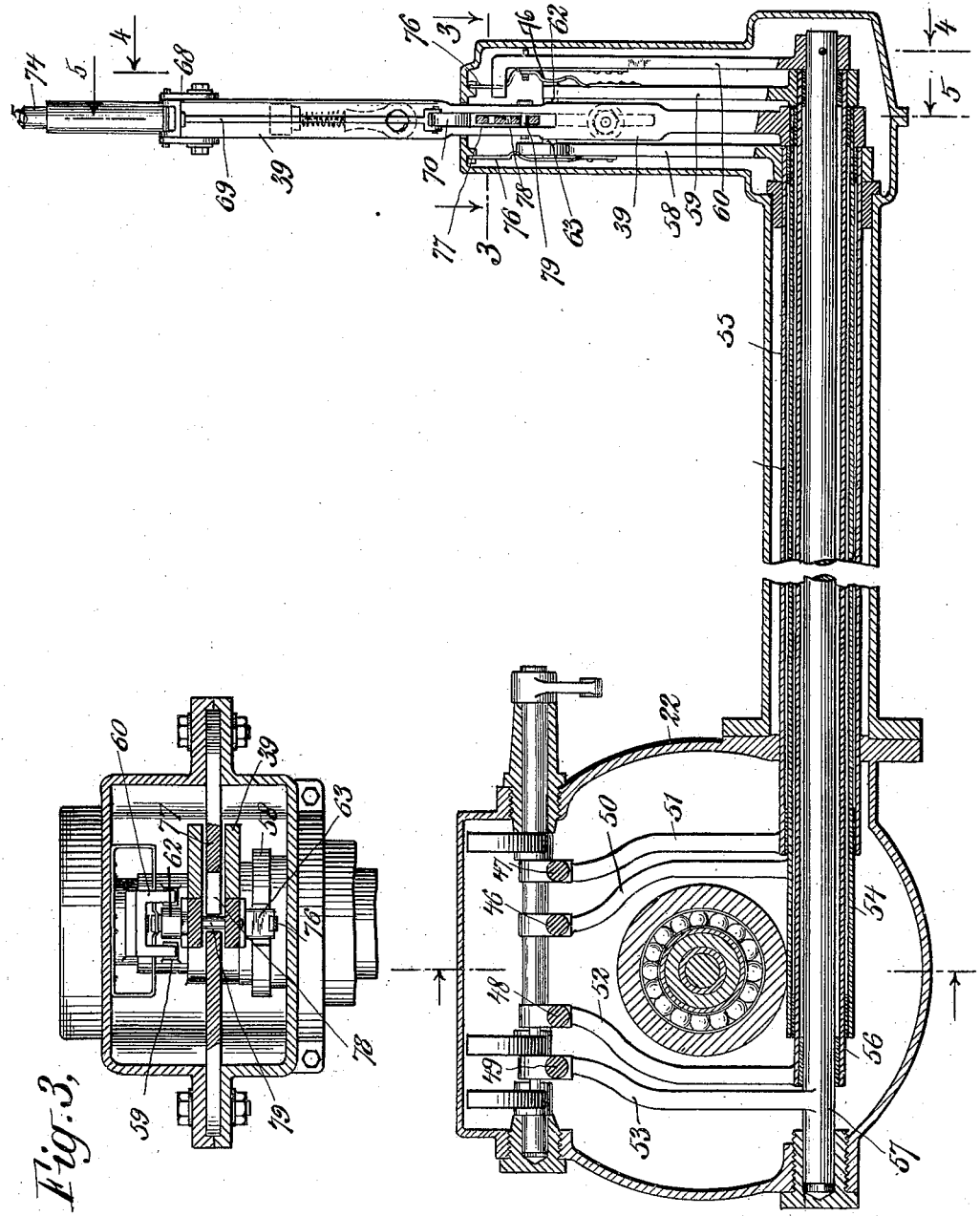

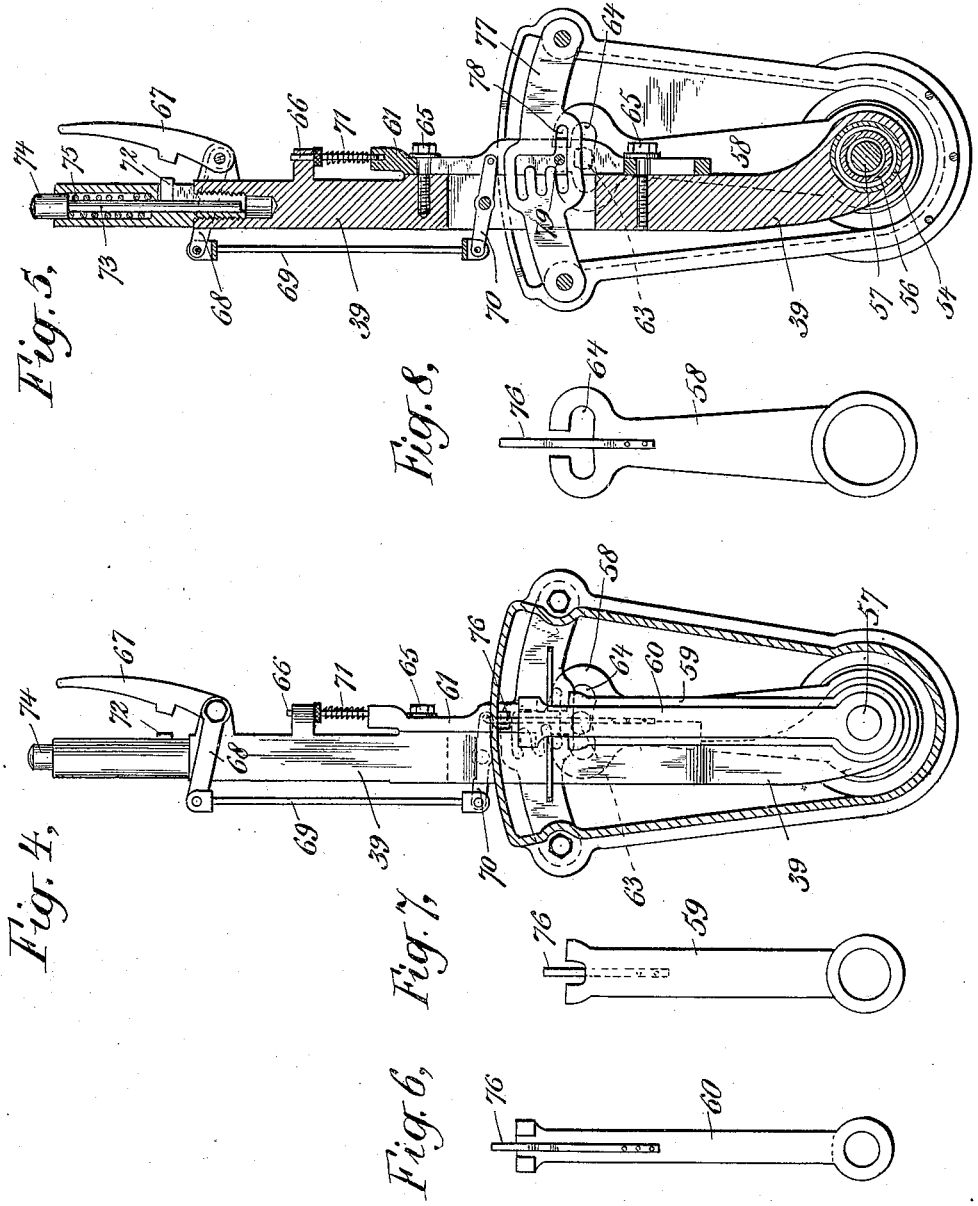

UNITED STATES PATENT OFFICE.

CLARK W. PARKER, OF SPRINGFIELD, MASSACHUSETTS, ASSIGNOR TO PARKER TRANSMISSION AND APPLIANCE COMPANY, OF SPRINGFIELD, MASSACHUSETTS, A CORPORATION OF MASSACHUSETTS.

CONTROLLING MEANS FOR TRANSMISSION-GEARING.

983,249.  Specification of Letters Patent.  Patented Jan. 31, 1911.

Original application filed February 24, 1910, Serial No. 545,563. Divided and this application filed June 11, 1910. Serial No. 566,304.

*To all whom it may concern:*

Be it known that I, CLARK W. PARKER, a citizen of the United States of America, and a resident of Springfield, county of Hampden, and State of Massachusetts, have invented certain new and useful Improvements in Controlling Means for Transmission-Gearing, of which the following is a specification, reference being had to the accompanying drawings, forming a part thereof.

My invention relates to improvements in operating and controlling mechanism, and particularly to mechanism adapted to be employed for operating and controlling transmission gearing for motor vehicles. In this class of mechanism a plurality of clutches are employed for connecting the driving and driven elements in different driving relation, and it is desirable that a single operating element be employed for operating the said clutches selectively. In accordance with my present invention I employ such a signal operating lever, and in connection therewith I arrange a plurality of operating arms to be selectively engaged thereby and moved therewith at the will of the operator. The means for selectively determining which of the operating arms is to be connected at the time to the controlling lever, comprises a pivoted hand piece carried by the lever in a convenient position to be grasped by the operator in handling the lever, and I provide a movable stop adapted in one position to limit the movement of the hand piece, and in another position to permit the hand piece to move a greater extent whereby the proper position of the hand piece may be determined readily and accurately in the operation of the device. The stop is conveniently provided with a thumb piece or other part in a convenient position to be manipulated by the operator in grasping the lever.

The objects of my invention are to utilize the forward and rearward movements of a controlling and operating lever to operate clutch or similar mechanism selectively without requiring in addition thereto, lateral movements of the lever such as is common in the selective type of controlling mechanism employed at the present time; to provide a means which shall be easy to operate and as nearly as possible "fool proof", and generally, to improve and simplify controlling mechanism for the general purpose aforesaid.

My invention also consists in certain novel details of construction and combinations of parts, all as will be fully set forth in the following specification, and in order that my invention may be thoroughly understood, I will now proceed to describe an embodiment thereof, having reference to the accompanying drawings illustrating the same, and will then point out the novel features in claims.

Figure 1 is a view in central longitudinal section through a transmission gearing with which my improved controlling means is adapted to be employed, and showing a portion of the connecting elements which connect the said controlling means therewith. Fig. 2 is a view in central vertical transverse section therethrough and through a controlling means constructed in accordance with my invention, the plane of section being substantially upon the line 2—2 of Fig. 1. Fig. 3 is a detail view in horizontal transverse section through the transmission gearing, the same being taken upon the line 3—3 of Fig. 2. Figs. 4 and 5 are views in vertical section of the controlling means, the same being taken respectively upon the lines 4—4 and 5—5 of Fig. 2. Figs. 6, 7, and 8 are detail views respectively in side elevation of the several arms which coact with the controlling lever.

The present application is a division of a copending application filed by me on the 24th of February, 1910, and serially numbered 545,563, in which the details of a complete transmission gearing are fully shown and described. The controlling device claimed herein is shown in detail in the said original application, and for convenience of reference I will employ in the present specification the same reference numerals as are employed in the original application, and specific reference is hereby made to the said original application for a type of transmission gearing with which my improved controlling means is particularly adapted to be employed.

The main operating member of the controlling means is a lever 39 mounted fast upon a sleeve 54 and arranged to rock, with the said sleeve, about an axis concentric to the sleeve. Disposed in proximity to the said main operating or controlling lever 39 are three operating arms 58—59—60, the arm 58 being secured upon a sleeve 55 which surrounds the said sleeve 54, the arm 59 being secured to a sleeve 56 disposed within the said sleeve 54, and the arm 60 being secured to a rock shaft 57 disposed within the said sleeve 56. The various sleeves and shafts have bearings with respect to each other, and the outer sleeve 55 has bearings in a tubular extension of the main casing 22, as will be well understood by reference to Fig. 2 of the drawings. Each of the arms 58—59—60 is so constructed and arranged that the controlling lever 39 may be moved independently thereof and without thereby imparting any movement thereto, but the said lever is provided with lateral studs or projections 62—63 arranged, under certain conditions, to co-act with any one of the said arms at the will of the operator. These studs or projections 62—63 are carried by a slide 61 which is mounted upon the lever 39. This slide is secured to the said lever by means of screws 65 which pass through slotted openings in the said slide whereby the slide may move longitudinally with respect to the said lever upon the front face thereof. A guide stem 66 is also provided, the same being guided in a suitable extension of the lever 39, and a spring 71 normally tends to depress the said guide and force it to its lowermost position. This slide is operated by means of a hand piece 67 pivotally connected to the lever near the upper end thereof, the connections between the two parts including an arm 68 carried by the hand piece, a rocking lever 70 pivoted to the controlling lever 39 and having one of its arms in engagement with the said slide, and a link 69 pivoted to the other arm of the said lever and to the outer extremity of the arm 68. By inspection of the drawings it will be readily seen that if the hand piece 67 be depressed the slide 61 will be lifted, while on the other hand, if pressure upon the hand piece be relaxed, the spring 71 will operate to lower the said slide and return the latch 70 to its normal outer position.

Each of the levers 58—59—60 has a bifurcated upper end forming jaws for co-engagement with the one or the other of the abutments 62—63 carried by the slide. The jaws are arranged upon different levels, the jaws of the lever 59 being arranged upon such a level as to receive the abutment 62 when the slide is in its lowermost position. At this time the abutment 63 is received within a recessed portion 64 of the operating arm or lever 58 so that the said lever 59 will be free to oscillate without imparting any corresponding movement to the said operating lever 58. The engagement of the stud or abutment 62 with the operating arm or lever 59 will, however, at such times compel movements of the said operating arm or lever in exact accordance with the movement of the controlling lever 39,—in other words, the two parts will be locked together and so will move together. If the hand piece 67 be depressed the required distance the slide 61 will be lifted to a point wherein the abutment 62 will be freed from engagement with the lever 59, and the abutment 63 will engage the jaws of the lever 58. When this occurs the movements of the controlling lever 39 will be imparted to the operating arm or lever 58 instead of to the operating arm or lever 59, the latter remaining stationary. The movement of the slide 61 for this purpose is limited by means of a stop 72 with which the hand piece is arranged to engage after it has been moved a sufficient distance to properly adjust the said slide 61. This stop 72 is carried by a rod 73 mounted to slide longitudinally in the upper extremity of the controlling lever 39. The said rod is provided at its upper extremity with a thumb piece 74 which projects beyond the upper extremity of the lever, and a spring 75 bears against the under side of this thumb piece thereby exerting an upward force upon the rod so as to maintain the stop 72 in its proper position with respect to the hand piece 67. The stop 72 projects, however, through a slotted opening in the side of the controlling lever, whereby it may be moved longitudinally with the rod. By depressing the thumb piece 74 the stop 72 may be moved out of register with the portion of the hand piece 67 adapted to engage it, thereby permitting a further inward movement of the latch as will be well understood. Such further inward movement will lift the slide 61 to an extent sufficient to carry the stud or abutment 63 out of register with the lever 58 and to carry the stud or abutment 62 into register with the jaws at the upper end of the operating arm or lever 60. The result of this will be that when the parts are so adjusted, rocking movements of the controlling lever 39 will be imparted to the lever 60, while the levers 58 and 59 will remain stationary. The operation then of this controlling lever is as follows: First, if rocking movements be imparted thereto without touching the hand piece 67 at all, the rocking arm or lever 59 will be moved therewith, and the rocking arms or levers 58 and 60 will remain at rest; second, if the hand piece be depressed without the thumb piece being touched, rocking movements imparted to the controlling lever 39 will be partaken of by the operating arm or lever 58, and the operating arms or levers 59 will remain stationary, while third, if the thumb piece 74 be depressed at the same time as the hand piece 67 is moved inward, rocking movements imparted to the controlling lever 39 will be partaken of by the operating arm or lever 60, while the operating arms 58—59 will remain at rest.

For the purpose of preventing accidental movements of those operating arms or levers which are not directly connected at the time to the controlling lever, I have provided stops in the form of spring tongues 76 carried by the said arms or levers, such as will normally engage portions stationary with the casing. The movement of either of the studs or abutments 62—63 into engagement with the several levers respectively will by engagement with these spring tongues cause them to be depressed to an extent sufficient to disengage them from the parts with which they are in normal engagement and so to permit their levers to move.

I have also provided a guiding means such as will act as a lock to prevent movements of the slide when the lever 39 is in any but a neutral position, such locking means comprising a stationary guide piece 77 having a slot 78 therein for engagement with a guiding stud 79 upon the slide 61. The slot 78 is of such a form as to permit vertical movements of the slide 61 only when the lever 39 is in its neutral position and to permit oscillating or rocking movements of the lever 39 only when the slide is at one of its three predetermined levels; furthermore, the slot is so arranged as only to permit the rocking movements of the lever 39 in the proper direction. In the particular construction shown the rocking lever may move in either direction when the slide is in its lowermost position, but when the slide is in either of its two upper positions, then a rocking movement of the lever is permitted in one direction only. This specific arrangement is, of course, for the purpose of meeting specific requirements of the particular transmission gearing employed and will be varied in accordance with the construction of the transmission gearing.

The foregoing form of controlling mechanism may be applied to the control and operation of transmission gearing of various forms and constructions. As before stated the transmission gearing for which this controlling means was particularly designed, is shown and described in detail in the original application of which this application is a divisional. In brief, this transmission gearing includes a driving shaft 20 and driven shaft 21 disposed axially in line with each other and suitably journaled in the casing 22, change speed gearing and a plurality of clutches being employed for connecting these two shafts in different driving relation. The clutches are operated by a plurality of shipper rods 46—47—48—49, the said shipper rods being arranged to slide longitudinally in suitable bearings in the casing. In Fig. 1 the shipper rod 46 is seen in side elevation and is shown as provided with arms 42—42, the lower ends of which engage elements of clutches 31 and 35, the former being arranged to connect the driving and driven shafts in direct connection, and the latter to connect the driving and driven shafts in connection through gearing including a pinion 26 mounted fast upon the drive shaft 20, a spur gear 27 mounted fast upon an intermediate shaft 23, a smaller spur gear 33 disposed upon the shaft 23, and a pinion 34 of somewhat larger diameter than the pinion 26 mounted loosely upon the driven shaft 21. The members of the clutches 31—35 carried by the arms 42—41 are arranged to slide upon the shaft 21, but are maintained against relative rotation with respect thereto by means of longitudinal splines or keys. The said clutch elements are, moreover, spring pressed in opposite directions by means of a spring 80, shouldered portions 84 of the said clutch elements tending to limit the outward movement of the said members with respect to the arms 42. There are other clutches, elements of which are carried by the several shipper rods, one of the said clutches appearing at 32 in Fig. 1, an arm 43 being mounted upon the shipper rod 47 for carrying the same. The several shipper rods are provided at their forward ends with forked heads for engagement with the upper ends of rocker arms 50—51—52—53 respectively, the said arm 50 engaging the shipper rod 46, the said arm 51 engaging the shipper rod 47, the said arm 52 engaging the shipper rod 48, and the said arm 53 engaging the shipper rod 49. The arm 50 is secured to, and carried by, the sleeve 54, and hence is rigidly secured to, and partakes of, the movements of the controlling lever 39. The arms 51—52—53 are rigidly secured to the sleeves 55—56 and the shaft 57 respectively, whereby they are in permanent engagement with the operating levers 58—59—60 respectively.

It will be understood that the various clutches throughout the transmision gearing are to be operated selectively at the will of the operator, any one of them being coupled with either of the clutches 31—33 upon the driving and driven shafts, and it will be readily understood from the foregoing that any one of the said clutches such as are operated respectively by the movements of the various shipper rods 47—48—49 in combination with the shipper rod 46, may be so operated by the proper manipulation of the controlling lever aforesaid. In the backward or forward movement of this controlling lever the shipper rod 46 will be operated in any event, and any one of the other shipper rods will be operated therewith in accordance with the position of the hand piece 67. If the hand piece is not touched, then the shipper rod 48, through its connection with the operating lever 59, will be moved with the shipper rod 46; on the other hand, if the hand piece 67 be depressed to the limit of the movement allowed by the stop 72, then the shipper rod 47, through its connection with the operating arm or lever 58, will be coupled with the shipper rod 46 and moved therewith, and again, if the hand piece 67 be depressed to the limit of the movement allowed after the stop 72 has been moved out of the way by depression of the thumb piece 74, then the shipper rod 49 will, through its connection with the operating arm or lever 60, be coupled with the shipper rod 46 and moved therewith.

What I claim is:

1. Controlling and operating means comprising a hand lever, a plurality of operating levers arranged for connection therewith, an element carried by the said hand lever and movable with respect thereto, the said element being arranged for selective coöperation with the said operating levers in accordance with its position upon the hand lever carrying it, hand operating means for moving the said element, and a movable stop also carried by the said hand lever for coöperating with the said element to limit the movement thereof.

2. Controlling and operating means comprising a hand lever, a pivoted hand piece carried thereby, a movable stop for coöperating with the said hand piece to limit the movement thereof, a plurality of operating levers, and means connected with the said hand piece for selectively connecting the said operating levers with the said hand lever.

3. Controlling means comprising a hand lever, a plurality of operating levers arranged for connection therewith, an element carried by said hand lever and movable with respect thereto for selective co-action with the said operating levers in accordance with its position upon the hand lever carrying it, a pivoted hand piece upon the said lever for moving the said element from one position to another, a movable stop carried by the said hand lever arranged when in one position to limit the movement of the said element, and a thumb piece for operating the said stop, mounted in the said hand lever and extending above the upper extremity thereof.

4. In transmision gearing, the combination with a plurality of clutch actuating elements, of a controlling lever therefor directly connected with one of them, a plurality of operating levers connected with the other said clutch operating elements, means for selectively connecting the said operating levers with the said controlling lever comprising a part carried by the said controller, and movable thereon into engagement with the said operating levers respectively, and a movable stop carried by the said controlling lever and arranged in one position to limit the movement of the said movable part.

CLARK W. PARKER.

Witnesses:
FRANK E. LADD,
WYMAN C. PARKER.